(12) United States Patent
Ligouy

(10) Patent No.: US 7,127,876 B2
(45) Date of Patent: Oct. 31, 2006

(54) DEVICE FOR TREATING FODDER AND REAPING MACHINE WHICH USES SUCH DEVICE FOR TREATING FODDER

(75) Inventor: Jean-Baptiste Ligouy, Cerdon (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/510,702

(22) PCT Filed: Apr. 11, 2003

(86) PCT No.: PCT/FR03/01154

§ 371 (c)(1),
(2), (4) Date: Oct. 15, 2004

(87) PCT Pub. No.: WO03/086046

PCT Pub. Date: Oct. 23, 2003

(65) Prior Publication Data

US 2005/0126148 A1    Jun. 16, 2005

(30) Foreign Application Priority Data

Apr. 18, 2002    (FR) ................................. 02 05100

(51) Int. Cl.
*A01D 61/00* (2006.01)
(52) U.S. Cl. .................................. 56/16.4 R
(58) Field of Classification Search ............ 56/16.4 R, 56/16.4 A, 16.4 C, 504, 249, 294, DIG. 12
See application file for complete search history.

(56) References Cited

U.S. PATENT DOCUMENTS

| | | | |
|---|---|---|---|
| 3,147,577 A * | 9/1964 | Sutherland er al. ........... 56/504 |
| 3,423,920 A * | 1/1969 | Woodring et al. ............ 56/294 |
| 3,465,507 A * | 9/1969 | Fishaw ........................ 56/294 |
| 3,698,168 A * | 10/1972 | Mott et al. .................... 56/294 |
| 3,859,777 A * | 1/1975 | Doering ....................... 56/16.7 |
| 3,900,071 A * | 8/1975 | Crawford ..................... 172/15 |
| 4,021,995 A * | 5/1977 | Hill .................................... 56/1 |
| 4,060,961 A | 12/1977 | Anderson et al. |
| 4,077,192 A * | 3/1978 | Klinner et al. ........... 56/16.4 R |
| 4,499,712 A * | 2/1985 | Klinner .................... 56/16.4 R |
| 4,512,146 A * | 4/1985 | Klinner ....................... 56/364 |
| 4,516,390 A * | 5/1985 | Klinner ....................... 56/364 |
| 5,088,275 A * | 2/1992 | Koorn et al. ................. 56/364 |
| 5,485,718 A * | 1/1996 | Dallman ...................... 56/294 |
| 6,000,205 A * | 12/1999 | Joray .......................... 56/294 |
| 6,692,351 B1 * | 2/2004 | Johnson et al. ............. 460/112 |

FOREIGN PATENT DOCUMENTS

| | | |
|---|---|---|
| FR | 2440145 | 5/1980 |
| GB | 842 620 | 7/1960 |
| GB | 1 256 554 | 12/1971 |
| NL | 8 601 315 | 12/1987 |

* cited by examiner

*Primary Examiner*—Árpád Fábián Kovács
(74) *Attorney, Agent, or Firm*—Oblon, Spivak, McClelland, Maier & Neustadt, P.C.

(57) ABSTRACT

A device for treating forage, intended to accelerate the drying and comprising a rotor which is rotated about an axis and includes a support and at least one conditioning element. The conditioning element includes at least one active part which is used to work the forage, a first connecting part which is used to connect the conditioning element to the support via a first connection, and a second connection which connects the conditioning element to the support if the first connection breaks.

15 Claims, 6 Drawing Sheets

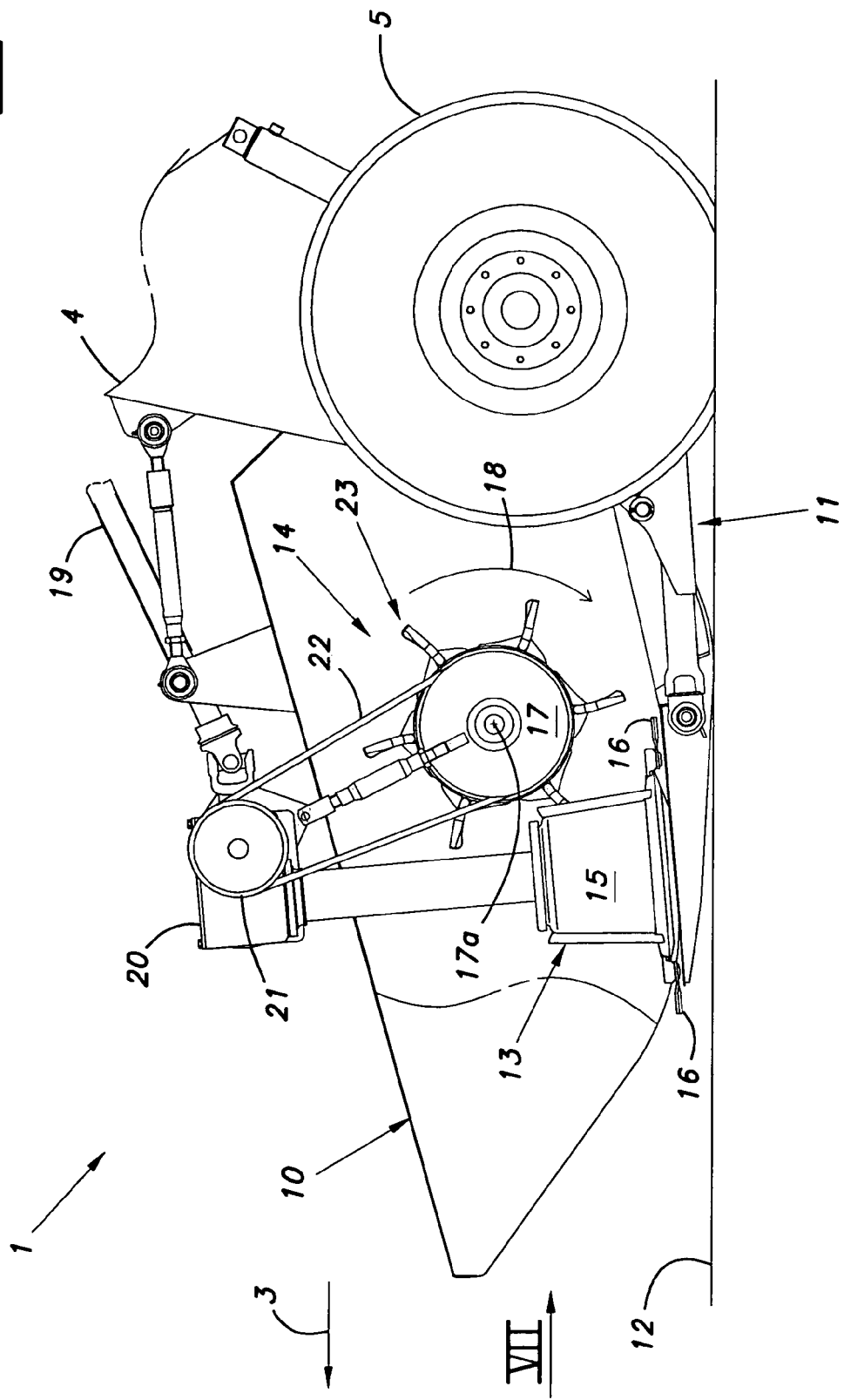

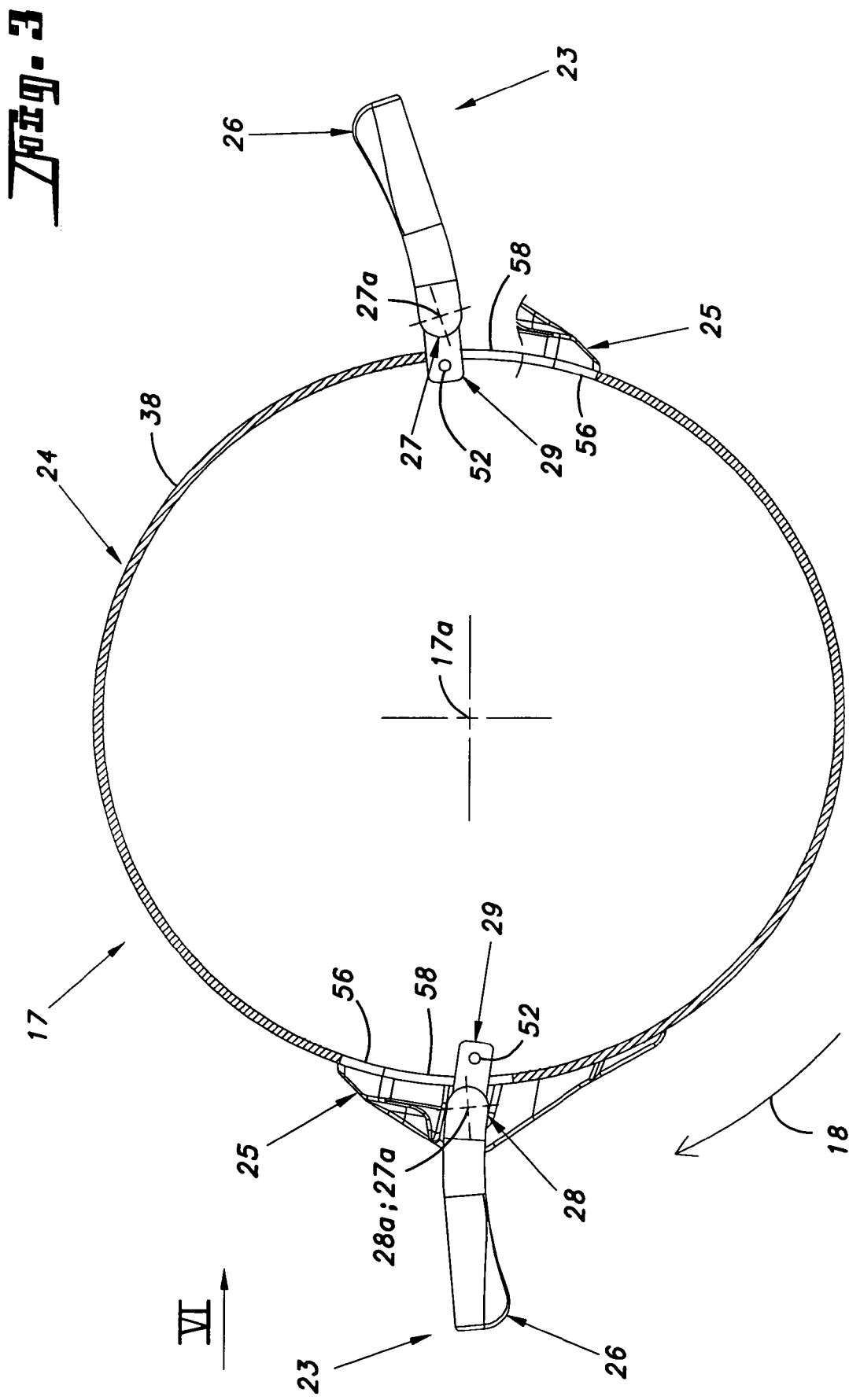

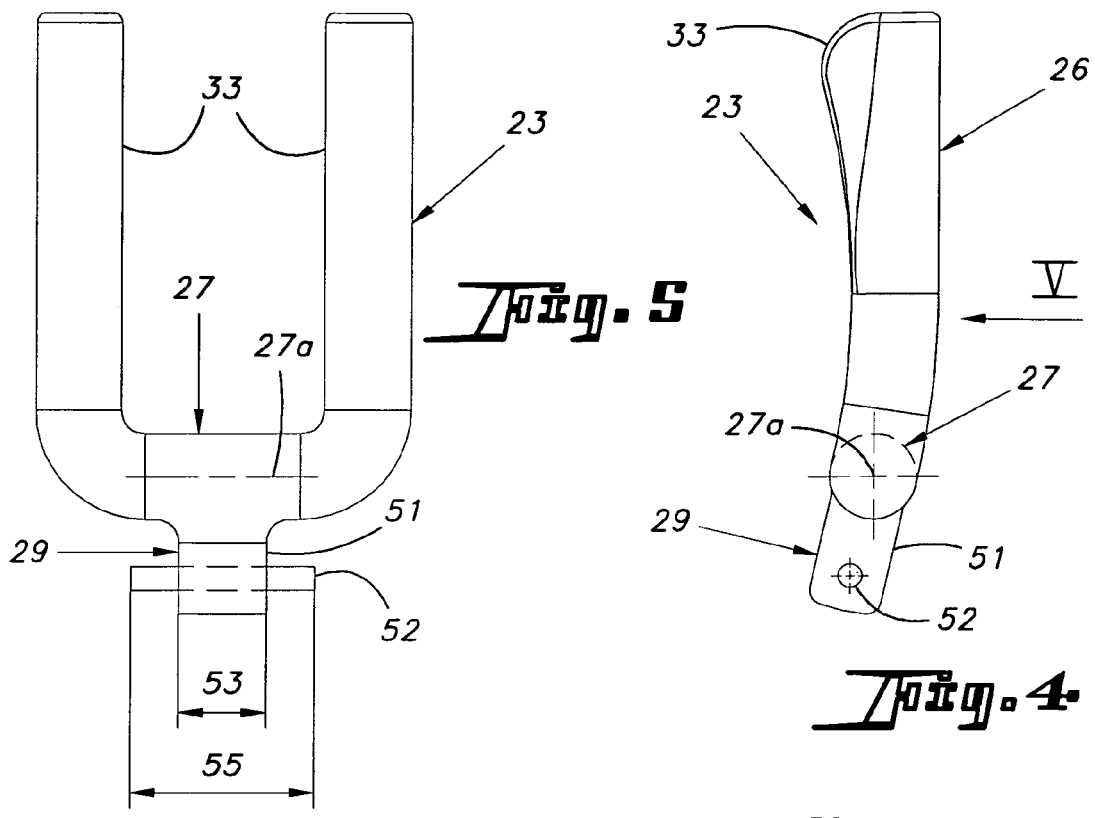
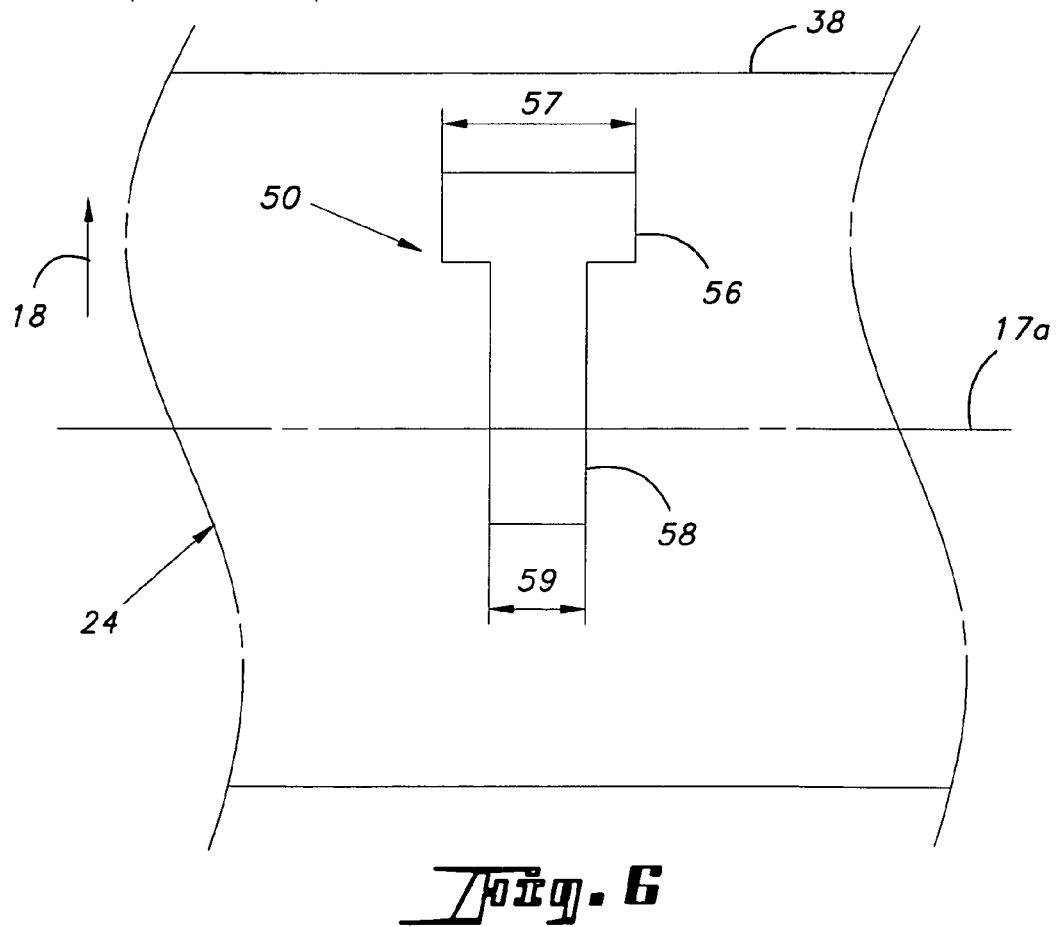

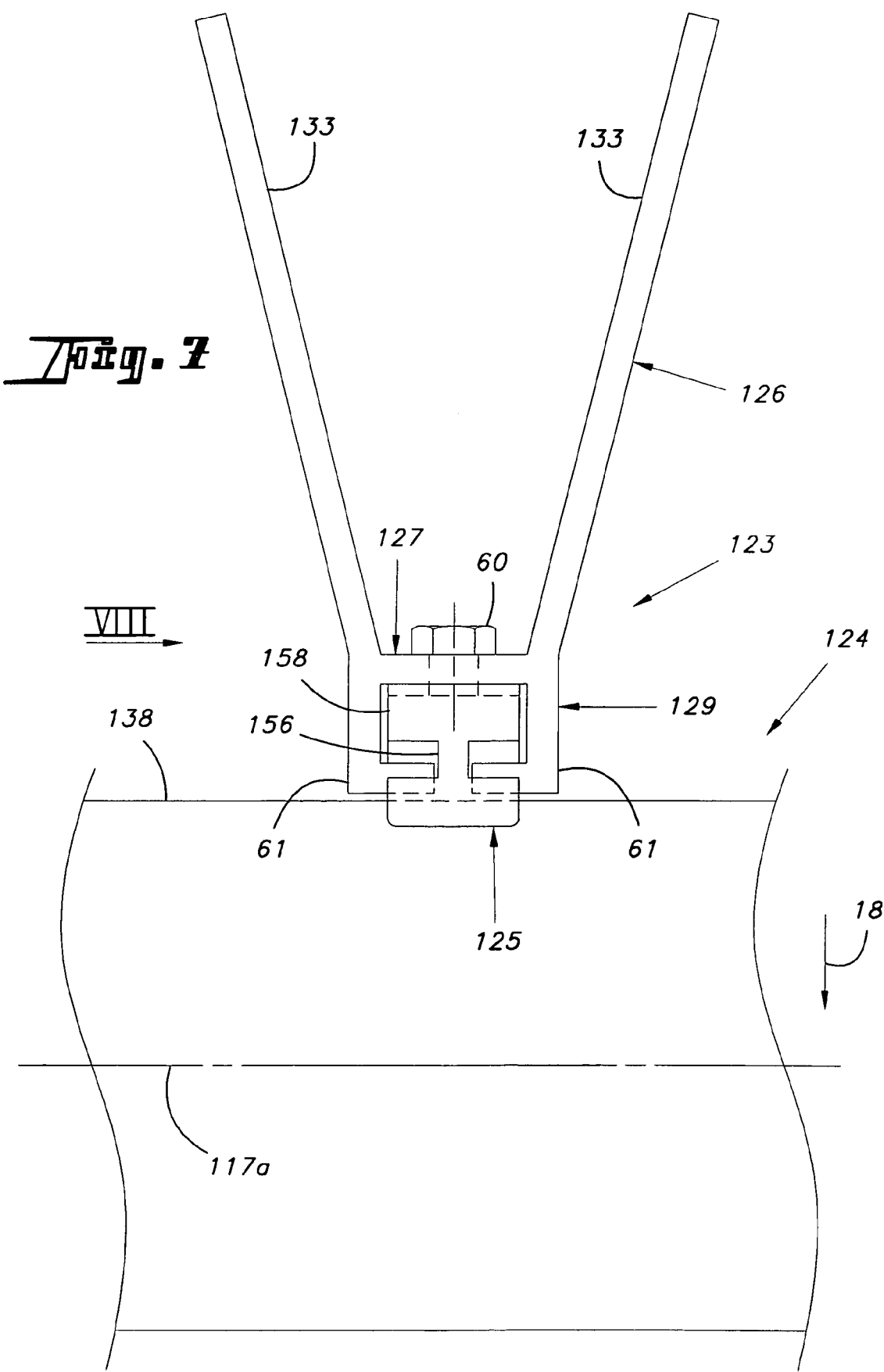

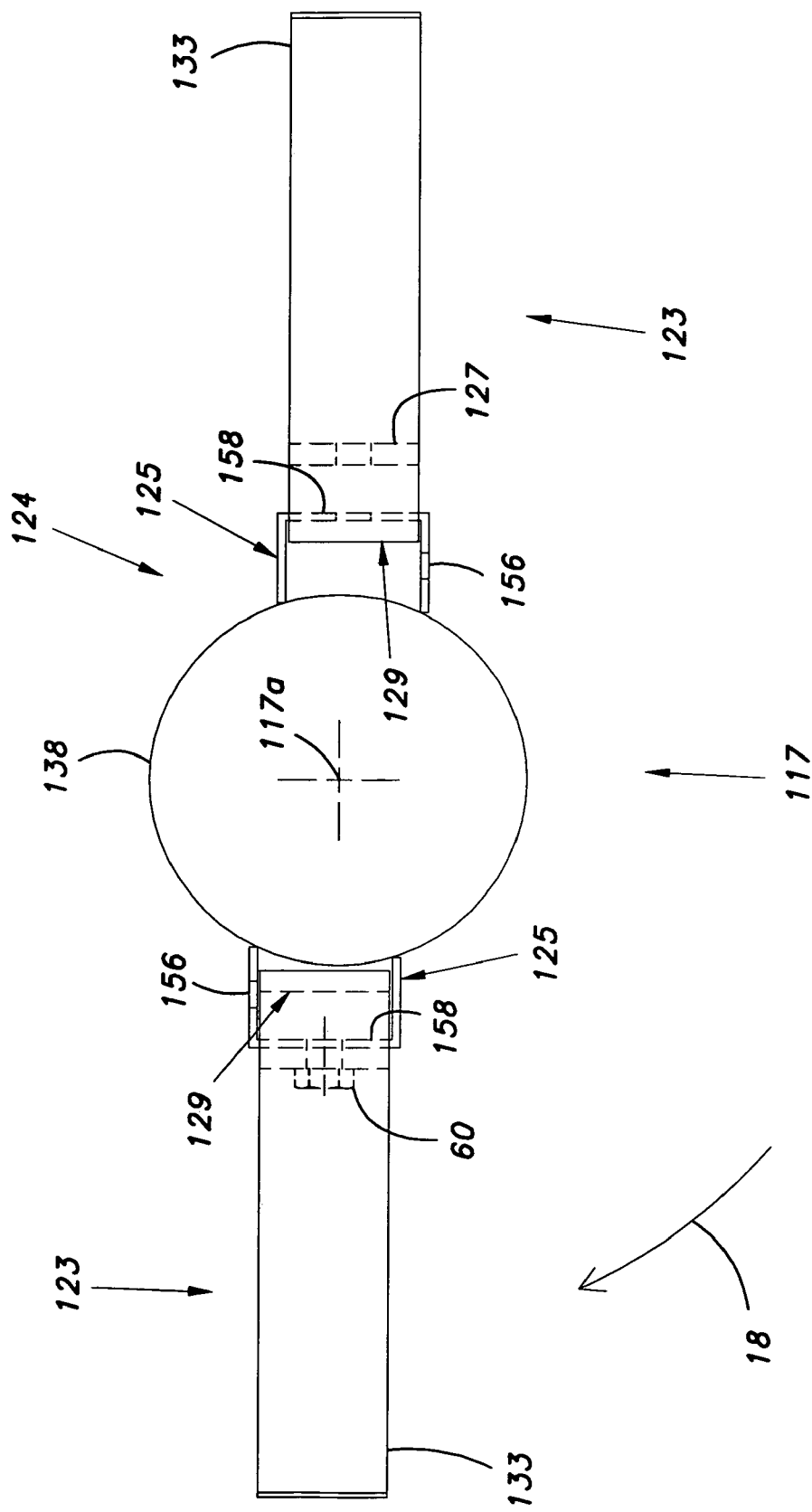

DEVICE FOR TREATING FODDER AND REAPING MACHINE WHICH USES SUCH DEVICE FOR TREATING FODDER

FIELD OF THE INVENTION

The present invention relates to a device for treating forage comprising a rotor driven in rotation about an axis, which rotor consists of a support and of at least one conditioning element, the conditioning element comprising at least one active part intended to work the forage and a first connecting part intended to connect the conditioning element to the support by means of a first connection.

When making hay, the cut grass needs to be completely dried prior to storage in order for the forage to keep well. Forage treatment devices, also called conditioners, advantageously make it possible to reduce the time needed for such drying. What these devices actually do is act mechanically to break up the film of wax which envelopes the stalks of the forage. This breaking-up encourages a rapid dissipation of the moisture contained in the plant.

BACKGROUND OF THE INVENTION

Document FR 2 440 145 describes a mower comprising a cutting mechanism intended to cut a standing product, for example grass. To do this, the cutting mechanism has four discs arranged in a transverse line of the said-mower and driven in rotation about a respective vertical axis.

This known mower also comprises a treatment device intended to reduce the time taken for the cut forage to dry. To do this, the forage treatment device comprises a rotor arranged behind the discs and driven in rotation about a horizontal axis. This rotor consists of conditioning elements and of a support. Each conditioning element comprises, at one of its ends, a connecting part. The connecting part allows the corresponding conditioning element to be connected pivotally to the said support by means of an articulation the axis of which is parallel to the axis of rotation of the said rotor. Because of the centrifugal force generated by the rotation of the said support, the conditioning element during work extends in a substantially radial direction.

Thus, during work, the forage coming from the cutting mechanism is carried, by an active part of the conditioning element, along a conditioning sheet to finally be ejected to the rear of the said mower. The passage of the forage against the said conditioning sheet causes a breaking-up of the stalks of the forage that encourages rapid drying of the latter. The brochure "Faucheuses-Conditionneuses frontales FC 15 280F / FC 313F Lift Control" [Front-mounted mower-conditioners FC 280F/FC 31 3F-lift control] published by the Applicant company, discloses another mower equipped with a forage treatment device. In that document, the said forage treatment device also comprises a rotor driven in rotation about a horizontal axis. This rotor consists of a support and of V-shaped conditioning elements. Each conditioning element this time is connected rigidly to the support by a central connecting part. The two ends of the V-shape extend in a radial position to form an active part.

During work, the rotational frequency of such rotors is generally between 600 and 1 000 revolutions per minute. As a result, if the connection between the support and the conditioning element should break, the latter element is ejected from the rotor violently by the centrifugal force. The conditioning element thus ejected constitutes a projectile travelling at relatively high speed. This projectile may damage other parts of the forage treatment device, particularly the conditioning sheet. Of far greater concern, such a projectile may also be dangerous to anybody close to the forage treatment device.

SUMMARY OF THE INVENTION

The object of the present invention is to avoid a conditioning element being able to cause damage or injury should the first connection connecting the said conditioning element to the support break.

To this end, the forage treatment device according to the present invention is characterized in that a second connection is provided, this being intended to connect the conditioning element to the support should the first connection break.

Should the first connection break, the second connection advantageously makes it possible to maintain a connection between the conditioning element and the support. Thus, the conditioning element will not be ejected from the rotor. The risks of damage and injury is therefore eliminated.

BRIEF DESCRIPTION OF THE DRAWINGS

Other features of the invention, to be considered separately or in all possible combinations, will become further apparent from the following description of some non-limiting exemplary embodiments of the invention that are depicted in the appended drawings in which:

FIG. 2 depicts, viewed from the side in the direction of arrow II defined in FIG. 1, and to a different scale, the agricultural mower of FIG. 1;

FIG. 3 depicts a view in section, in the direction of arrow III defined in FIG. 1, and to a different scale, of a rotor according to the present invention;

FIG. 4 depicts, on a different scale, a conditioning element of the rotor of FIG. 3;

FIG. 5 depicts, viewed from the side in the direction of arrow V defined in FIG. 4, the conditioning element of FIG. 4;

FIG. 6 depicts, viewed in the direction of arrow VI defined in FIG. 3, and on a different scale, a portion of the surface of the tube of FIG. 3;

FIG. 7 depicts, viewed from the front in the direction of arrow VII defined in FIG. 2, a partial view of another rotor according to the present invention; and FIG. 8 depicts, viewed from the side in the direction of arrow VIII defined in FIG. 7, and to a different scale, the rotor of FIG. 7.

DETAILED DESCRIPTION OF THE INVENTION

Figure 1:
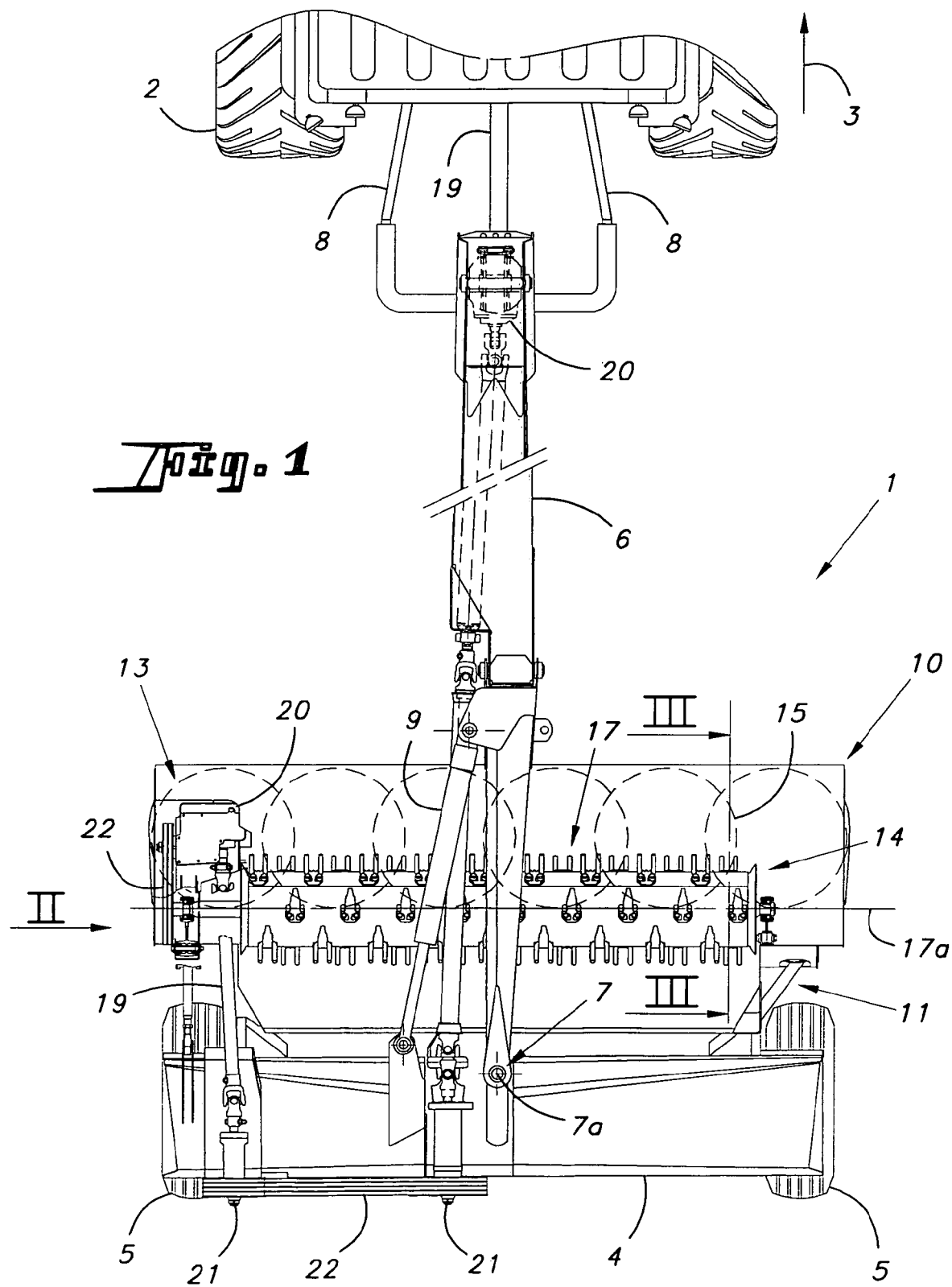
FIG. 1 depicts, viewed from above, an agricultural mower according to the present invention.

FIG. 1 depicts, in a view from above, an agricultural mower (1) according to the present invention. The mower (1) is hitched to a motor vehicle (2) which pulls 20 it in a sense and direction of forward travel indicated by the arrow (3). In the remainder of the description, the ideas of "front" and "rear", "in front of" and "behind" are defined with respect to the direction of forward travel and the ideas of "right" and "left" are defined when viewing the mower (1) from behind in the direction of forward travel (3).

In a way known to those skilled in the art, the mower (1) comprises a chassis (4) which rests on the ground (12) by means of two wheels (5). The chassis (4) is connected to the rear end of a drawbar (6) by means of a central articulation (7) of substantially vertical axis (7a). For its part, the front end of the drawbar (6) is connected to the lower hitching bars (8) of the motor vehicle (2).

In the exemplary embodiment depicted in FIG. 1, the mower (1) is arranged substantially in the continuation of the motor vehicle (2). This configuration is used when the mower (1) is being transported. During work, the central articulation (7) allows the mower (1) to be offset to the right or to the left of the motor vehicle (2) by means of a ram (9). The mower (1) can thus advantageously operate back and forth.

In a way also known to those skilled in the art, the mower (1) additionally comprises a mowing unit (10) connected to the chassis (4) by means of a suspension (11). The suspension (11) allows the mowing unit (10) to follow unevennesses of the ground (12) independently of the chassis (4). Advantageously, the suspension (11) also allows at least some of the weight of the mowing unit (10) to be transferred onto the chassis (4). The mowing unit (10) is made up of a cutting mechanism (13) and of a forage treatment device (14).

The cutting mechanism (13) is intended to cut a standing product, for example grass. To do this, the cutting mechanism (13) comprises several cutting members (15) driven in rotation about a respective substantially vertical axis. The cutting members (15), depicted symbolically in FIG. 1, are advantageously arranged in a line transversal to the direction of forward travel (3).

As illustrated in FIG. 2, each cutting member (15) supports two cutting elements (16). During work, the cutting elements (16), also called knives, describe circles in a substantially horizontal plane. The relatively high speed of movement of the cutting elements (16), due essentially to the rotation of the cutting members (15), allows the standing product to be cut.

For its part, the forage treatment device (14) is intended to accelerate the drying of the product cut by the cutting mechanism (13). To do this, the forage treatment device (14) comprises a rotor (17) driven in rotation about an axis (17a) that is substantially horizontal and transversal to the direction of forward travel (3). The direction in which the rotor (17) rotates is indicated on FIGS. 2 and 3 by the arrow (18).

During work, the rotor (17) carries the forage coming from the cutting mechanism (13) along a conditioning sheet. The passage of the forage against the conditioning sheet causes breaking-up that encourages rapid drying of the cut product. As the conditioning sheet is within the competence of the person skilled in the art, it has therefore not been depicted in the figures.

In a way known to those skilled in the art, the mower (1) also comprises transmission elements intended to transmit rotational movement from a power take-off of the motor vehicle (2) as far as the said cutting elements (16) and the rotor (17). These transmission elements are, in particular, telescopic shafts with universal joints (19), gearboxes (20), pulleys (21) and belts (22).

Certain elements of the mower (1) have been depicted only partially in FIGS. 1 and 2 in order to make the present invention easier to understand.

In order to carry the forage effectively along, the rotor (17) consists of a support (24) and of at least one conditioning element (23). Indeed, each conditioning element (23) is provided with an active part (26) which, during work, extends in an at least substantially radial direction with respect to the axis of rotation (17a). The active parts (26) thus act like clutches to drive the forage along the said conditioning sheet. Each conditioning element (23) also comprises a first connecting part (27) intended to connect the conditioning element (23) to the support (24) by means of a first connection.

In the first exemplary embodiment depicted in FIGS. 1 to 6, the first connection pivotally connects the conditioning element (23) to the support (24). By contrast, in the second exemplary embodiment depicted in FIGS. 7 and 8, the first connection rigidly connects the conditioning element (123) to the support (124). The second exemplary embodiment will be described in greater detail later on.

In the first exemplary embodiment, the first connection is achieved by means of an articulation (28) of the pivot type and of axis (28a). As a preference, the axis (28a) of the articulation (28) is at least substantially parallel to the axis of rotation (17a) of the rotor (17). Should an obstacle be encountered, the active part (26) of the conditioning element (23) can advantageously retract, pivoting backwards with respect to the direction of rotation (18) of the rotor (17).

More specifically and as depicted in FIG. 3, the first connecting part (27) of the conditioning element (23) has a cylindrical shape of longitudinal axis (27a). For its part, the support (24) comprises at least one connecting element (25) equipped with a mark of a shape that complements the cylindrical shape of the first connecting part (27). The support (24) also consists of a tube (38) the longitudinal axis of which is coincident with the axis of rotation (17a) of the rotor (17). The said connecting element (25) is fixed to the surface of the tube (38), advantageously removably. When this exemplary embodiment of the rotor (17) is being assembled, the cylindrical shape of the first connecting part (27) sits in the mark of the connecting element (25) so as to achieve the articulation (28). Advantageously, the axis (27a) of the connecting part (27) is at least substantially coincident with the axis (28a) of the articulation (28).

In the exemplary embodiment depicted more specifically in FIGS. 4 and 5, the active part (26) of the said conditioning elements (23) comprises two substantially identical fingers (33). The fingers (33) are offset one with respect to the other in a direction substantially parallel to the longitudinal axis (27a) of the connecting part (27), while at the same time remaining substantially mutually parallel. In addition, the fingers (33) are substantially perpendicular to the longitudinal axis (27a) of the connecting part (27). The fingers (33) are also curved slightly so as to be able easily to release the forage after the passage of the conditioning sheet.

Each end of the cylindrical shape (27) extends as far as a respective finger (33). The active part (26) and the connecting part (27) thus substantially form a U. The conditioning element (23) therefore is at no risk of excessive translational movement with respect to the corresponding said connecting element (25) along the axis (28a) of the articulation (28).

According to an important feature of the present invention, a second connection is provided, this being intended to connect the conditioning element (23) to the support (24) should the first connection break.

In the first embodiment, should the first connection break, the second connection takes place more precisely between the conditioning element (23) and the tube (38). As a preference, the second connection takes place between a second connecting part (29) of the conditioning element (23) and the tube (38).

To achieve this, and as shown by FIGS. 4 and 5, the second connecting part (29) comprises a body (51) and a head (52). The body (51) is connected to the first connecting part (27) and the head (52) is advantageously distant from the axis (27a) of the first connecting part (27). In addition, the width (55) of the head (52), viewed along the axis (27a)

exceeds the width (53) of the body (51). As a preference, the second connecting part (29) extends at least substantially at right angles to the first connecting part (27). In the exemplary embodiment depicted in FIGS. 4 and 5, the head (52) is produced by means of an elastically deformable element inserted transversely into the body (51). According to another not depicted exemplary embodiment, the body (51) and the head (52) are made of one and the same piece.

Advantageously, the second connecting part (29) extends at least partially into the said tube (38). The second connecting part (29) is thus protected, particularly against repeated contact with the cut product. To do this, in the first exemplary embodiment depicted more specifically in FIG. 6, the surface of the tube (38) has at least one notch (50). The notch (50) is made up of an entry area (56) of which the width (57), viewed along the axis of rotation (17a), is greater than or equal to the width (55) of the head (52). The entry area (56) allows the second connecting part (29) to be introduced at least partially into the tube (38). The notch (50) also comprises a holding area (58) the width (59) of which, viewed along the axis of rotation (17a), is less than the width (55) of the head (52) but greater than or equal to the width (53) of the body (51). The holding area (58) of the tube (38) is intended to collaborate with the second connecting part (29) of the conditioning element (23) so as to produce the second connection. The notch (50) preferably extends in a plane at least substantially perpendicular to the axis of rotation (17a). In addition, when viewed in the direction of rotation (18) of the support (24), the entry area (56) is advantageously arranged forward of the holding area (58).

In order to make the present invention easier to understand, the sectioned view of the rotor (17), depicted in FIG. 3, comprises just two conditioning elements (23) connected to the tube (38) by means of a respective connecting element (25).

The conditioning element (23) situated to the left in FIG. 3 is depicted in the normal work position. The conditioning element (23) is therefore connected to the support (24) by means of the first connection. The said head (52) of the second connecting part (29) is not in contact with the tube (38). The said second connection is therefore without effect.

By contrast, the conditioning element (23) situated to the right in FIG. 3 is depicted following breakage of the first connection. The head (52) comes into contact with the interior surface of the tube (38). As the width (59) of the holding area (58) is less than the width (55) of the head (52), the conditioning element (23) will therefore not be ejected from the support (24). Any excessive movement, in directions other than the radial direction, of the conditioning element (23) with respect to the support (24) is eliminated by contact between the body (51) and the edges of the holding area (58). The conditioning element (23) situated to the right is therefore connected to the support (24) by means of the second connection.

As one of the possible causes of breakage of the first connection is breakage of the connecting element (25), the connecting element (25) situated to the right in FIG. 3 is depicted only in part in order to symbolize this breakage.

The plane of section in which FIG. 3 is depicted passes through two notches (50) so that these can be seen. By contrast, for reasons of clarity, the corresponding said connecting element (25) and the corresponding said conditioning element (23) have not been sectioned in FIG. 3.

FIGS. 7 and 8 depict a second exemplary embodiment of a rotor (117) according to the present invention. This rotor (117) has a certain number of elements which were described earlier. These elements will therefore keep the same reference numeral and will not be described again. It also has a certain number of elements which are comparable with elements of the rotor (17) described earlier. These elements will be given the same reference numeral as the comparable elements of the rotor (17), but increased by 100. They will be described only where necessary.

The rotor (117) depicted in FIGS. 7 and 8 may advantageously be mounted on the mower (1) in place of the rotor (17) depicted in particular in FIGS. 1 and 2. Thus, the rotor (117) is also driven in rotation about an axis (117a) that is substantially horizontal and transversal to the said direction of forward travel (3).

In the second exemplary embodiment depicted in FIGS. 7 and 8, the rotor (117) also comprises a support (124) and at least one conditioning element (123). As FIG. 7 shows, the said conditioning element (123) is V-shaped. The two fingers (133) of the V-shape extend, during work, in an at least substantially radial direction with respect to the axis of rotation (117a). The fingers (133) thus form an active part (126). The central part of the conditioning element (123) constitutes a first connecting part (127) intended to connect the conditioning element (123) to the support (124) by means of a first connection.

By contrast, in the second exemplary embodiment, the first connection rigidly connects the conditioning element (123) to the support (124). As a preference, the conditioning element (123) is connected rigidly but removably to the support (124) by the first connection.

More specifically and in the light of FIGS. 7 and 8, the first connecting part (127) of the conditioning element (123) has a relatively flat shape. For its part, the support (124) comprises at least one connecting element (125) also equipped with a relatively flat part. A screw (60) allows the first connecting part (127) to be pressed firmly against the connecting element (125) so as to make the first connection. The support (124) additionally consists of a tube (138) the longitudinal axis of which is coincident with the axis of rotation (117a) of the said rotor (117). This time, the connecting element (125) is fixed to the surface of the tube (138) by welding, for example, so as not to be removable.

According to an important feature of the present invention, a second connection is provided, this being intended to connect the conditioning element (123) to the support (124) should the first connection break.

In the second exemplary embodiment, should the first connection break, the second connection is made more specifically between the conditioning element (123) and the connecting element (125). As a preference, the second connection is made between a second connecting part (129) of the conditioning element (123) and the connecting element (125).

To achieve this and in the light of FIG. 7, the second connecting part (129) has two lugs (61). Each lug (61) has a branch directed radially towards the axis of rotation (117a) and a branch directed along the axis of rotation (117a). The lugs (61) are advantageously directed towards one another so that, when viewed along the axis of rotation (117a), the distance separating the lugs (61) involves a narrowing.

For its part, the support (125) has an entry area (156) allowing the second connecting part (129) to pass the narrowing. The support (125) also comprises a holding area (158) intended to collaborate with the lugs (61) of the conditioning element (123) so as to produce the second connection. Viewed in the direction of rotation (18) of the support (124), the entry area (156) is advantageously arranged forward of the holding area (158).

In order to make the present invention easier to understand, FIG. 8 depicts only two conditioning elements (123) connected to the respective connecting element (125).

The conditioning element (123) situated to the left in FIG. 8 is depicted in the normal work position. The conditioning element (123) is therefore connected to the support (124) by means of the first connection. The lugs (61) of the second connecting part (129) are not in contact with the holding area (158). The second connection is therefore without effect.

By contrast, the conditioning element (123) situated to the right in FIG. 8 is depicted following breakage of the first connection. As the conditioning element (123) is driven by centrifugal force, the lugs (61) therefore come into contact with the holding area (158). As shown by FIG. 7, since the width of the holding area (158) is greater than the narrowing between the lugs (61), the conditioning element (123) will therefore not be ejected from the support (124). The conditioning element (123) situated to the right in FIG. 8 is thus connected to the support (124) by means of the second connection.

As a preference, when the lugs (61) are in contact with the holding area (158), the said narrowing between the lugs (61) is situated outside of the entry area (156). This is particularly visible in the right-hand part of FIG. 8. Thus, should the first connection break, there is no risk of the second connecting part (129) crossing the entry area (156). The second connection is therefore perfectly safe.

The mower (1), the forage treatment device (14) and the rotors (17; 117) which have just been described are merely exemplary embodiments which must not in any way be taken to limit the field of protection defined by the claims which follow.

Indeed, the forage treatment device (14) according to the present invention may also be fitted to an agricultural machine that has no cutting mechanism (13). Such an agricultural machine is intended merely to treat a product, which has been cut by another machine.

The invention claimed is:

1. A forage treatment device for treating forage comprising:
    a rotor driven in rotation about an axis, the rotor including a support and at least one conditioning element, the at least one conditioning element comprising:
        at least one active part configured to work the forage;
        a first connecting part having a first connection member configured to connect the at least one conditioning element to the support by said first connection member; and
    a second connecting part configured to maintain connection of the at least one conditioning element to the support only when the first connection member breaks wherein the second connecting part includes a body and a head, a width dimension of the head being greater than a width dimension of the body.

2. A forage treatment device according to claim 1, wherein the support includes a tube and at least one connecting element.

3. A forage treatment device according to claim 2, wherein the second connecting part is configured to connect the at least one conditioning element to the tube should the first connection member break.

4. A forage treatment device according to claim 1 wherein the body is connected to the first connection member.

5. A forage treatment device according to claim 1 wherein the second connecting part extends at least partially inside the tube.

6. A forage treatment device according to claim 5, wherein a surface of the tube has at least one notch allowing the second connecting part to be introduced at least partially into the tube.

7. A forage treatment device according to claim 6, wherein the at least one notch comprises an entry area having a width greater than or equal to the width of the head.

8. A forage treatment device according to claim 6, wherein the at least one notch includes a holding area with a width less than the width of the head but greater than or equal to the width of the body.

9. A forage treatment device according to claim 6, wherein the at least one notch extends in a plane at least substantially perpendicular to an axis of rotation of the rotor.

10. A forage treatment device according to claim 6, wherein the at least one notch includes an entry area and a holding area, and wherein, viewed in a direction of rotation of the rotor, the entry area is arranged forward of the holding area.

11. A forage treatment device according to claim 3, wherein the at least one connecting element is removably connected to the tube.

12. A forage treatment device according to claim 1, wherein the first connection member comprises an articulation member of a pivot type.

13. A forage treatment device according to claim 2, wherein the second connecting part is configured to connect the at least one conditioning element to the at least one connecting element should the first connection break.

14. An agricultural machine comprising a forage treatment device according to claim 1.

15. An agricultural machine according to claim 14, wherein the agricultural machine comprises a mower.

* * * * *